US012408019B2

(12) United States Patent
Afzal

(10) Patent No.: US 12,408,019 B2
(45) Date of Patent: Sep. 2, 2025

(54) METHODS AND SYSTEMS TO ACHIEVE COMPLETE REDUNDANCY FOR A SUBSCRIBER DATA POINT SYSTEM

(71) Applicant: T-Mobile USA, Inc., Bellevue, WA (US)

(72) Inventor: Muhammad Afzal, McKinney, TX (US)

(73) Assignee: T-Mobile USA, Inc., Bellevue, WA (US)

( * ) Notice: Subject to any disclaimer, the term of this patent is extended or adjusted under 35 U.S.C. 154(b) by 469 days.

(21) Appl. No.: 18/076,155

(22) Filed: Dec. 6, 2022

(65) Prior Publication Data

US 2024/0187838 A1  Jun. 6, 2024

(51) Int. Cl.
*H04W 8/18* (2009.01)
*H04M 15/00* (2006.01)
*H04W 76/12* (2018.01)

(52) U.S. Cl.
CPC ............. *H04W 8/18* (2013.01); *H04M 15/76* (2013.01)

(58) Field of Classification Search
CPC ....... H04W 8/18; H04W 76/12; H04M 15/76; G06F 16/275
See application file for complete search history.

(56) References Cited

U.S. PATENT DOCUMENTS

| 11,042,501 | B2 * | 6/2021 | Zhu | G06F 3/061 |
| 11,960,504 | B2 * | 4/2024 | Chauhan | H04L 67/1095 |
| 11,966,297 | B2 * | 4/2024 | Upadhyay | G06F 11/1448 |
| 2017/0264730 | A1 * | 9/2017 | Murray | H04L 51/04 |
| 2022/0094660 | A1 * | 3/2022 | Ku | H04M 7/0075 |
| 2022/0245032 | A1 * | 8/2022 | Singh | G06F 16/275 |
| 2022/0272550 | A1 * | 8/2022 | Madhukiran | H04W 8/08 |
| 2023/0412374 | A1 * | 12/2023 | Hohner | H04L 9/0894 |
| 2024/0354288 | A1 * | 10/2024 | Birka | G06F 16/1727 |

* cited by examiner

*Primary Examiner* — Khawar Iqbal
(74) *Attorney, Agent, or Firm* — Lee & Hayes, P.C.

(57) ABSTRACT

Methods and systems to achieve complete redundancy for a subscriber data point are disclosed. The subscriber data point (SDP) may be implemented on an account balance management function (AMBF) of a 5G charging system. According to an implementation, a first computing device of the AMBF may be scheduled to perform an operation on subscriber data stored in a first database, and a second computing device of the AMBF may be scheduled to perform the same operation on subscriber data stored in a second database after a preset time period from the first computing device performing the operation. The first computing device may set a flag in the first database and the second database when the operation starts. The second computing device may check the flag status when starting the operation. Upon detecting the flag is on in the second database, the second computing device may terminate the operation.

14 Claims, 5 Drawing Sheets

(A)

(B)

METHODS AND SYSTEMS TO ACHIEVE COMPLETE REDUNDANCY FOR A SUBSCRIBER DATA POINT SYSTEM

BACKGROUND

In a charging system of the 5G network, a subscriber data point (SDP) is a distributed system that holds the subscriber database. By default, the SDP is an available and partition (AP) tolerant system, in which, the subscriber data is replicated to two or more partitions and at least two servers are scheduled to run the jobs related to the subscriber data. However, according to the current system design, certain types of jobs such as, bill cycle, life cycle, or subscriber database snapshot, are only run by one partition of the system. When the server scheduled to run the jobs at that partition of the system is down, the jobs may be dropped as other servers are not scheduled to run the same jobs based on the replicas of the subscriber. As a result, a network function entity such as, a billing system, may not have the up-to-date subscriber data to generate the accurate bills. In another example, without the latest snapshot of the subscriber data, it may be difficult to recover the subscriber data.

BRIEF DESCRIPTION OF THE DRAWINGS

The detailed description is described with reference to the accompanying figures. In the figures, the left-most digit(s) of a reference number identifies the figure in which the reference number first appears. The use of the same reference numbers in different figures indicates similar or identical components or features.

DETAILED DESCRIPTION

Figure 1:
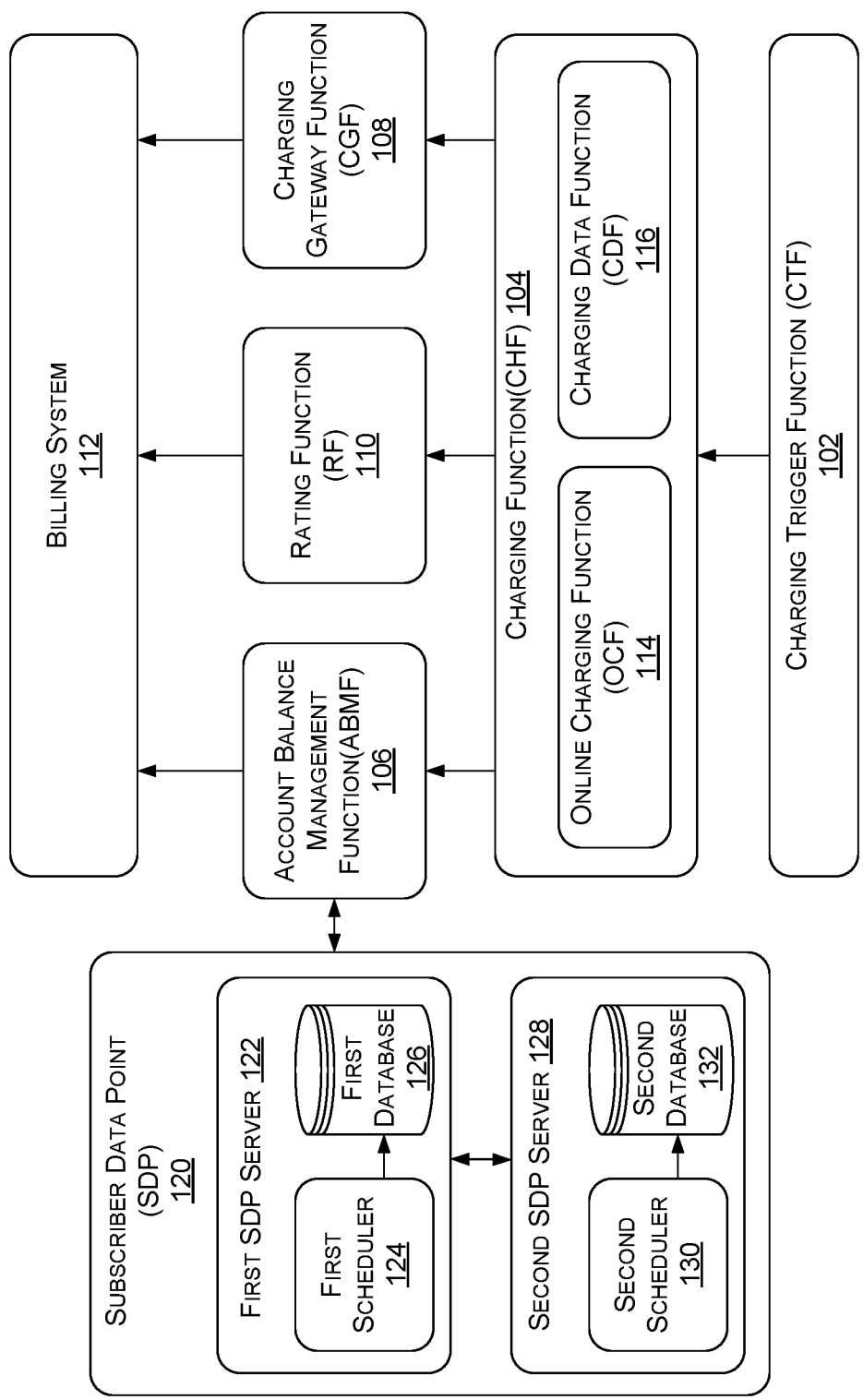
FIG. 1 illustrates an example charging system in a 5G network, in which methods for achieving complete redundancy for a subscriber data point (SDP) system are implemented.

Techniques for achieving complete redundancy for a subscriber data point system are disclosed herein. In some implementations, a method for achieving complete redundancy for an SDP system may be implemented on a charging system of the 5G network. In some examples, the SDP system may be implemented on an account balance management function (ABMF) of the charging system. The SDP system may comprise a plurality of servers scheduled to perform a plurality of jobs related to the subscriber data stored at various partitions of the SDP system. In implementations, two or more servers may be scheduled to actively perform the jobs to ensure the availability of the subscriber data to other network elements.

In implementations, a first server associated with a first partition of the SDP system may be scheduled to perform a job related to the subscriber data ahead of the rest of the active servers. Upon starting to perform the job, the first server may set a flag in a first database to indicate that the job is performed by the first server. The flag may be replicated to a second database associated with a second partition of the SDP system. In implementations, the format of the flag may be numbers, characters, vectors, arrays, or any combination thereof. The flag may be shared among the plurality of servers of the SDP systems.

As discussed herein, a second server associated with the second partition of the SDP system may start to perform the same job after a preset time period. The second server may check a status of the flag in the second database. When the flag is set, the second server may determine that the job is already performed by the first server. The second server may terminate the job and reset the flag in the second database. If the first server successfully completes the job, the first server may generate a report to provide to other network function entities. When the flag is not set, the second server may determine that the job is not performed by the first server and continue to complete the job.

In implementations, the job related to the subscriber data may include running a bill cycle on the subscriber data. The first server or the second server of the SDP system may generate a report to include an up-to-date balance and/or credit information of the subscribers. The report may be further provided to a billing system to generate the bills.

In another implementation, the job related to the subscriber data may include running a life cycle on the subscriber data. The first server or the second server of the SDP system may generate a report to include an up-to-date subscription information of the subscribers. The report may be further provided to the billing system and/or a content management system. In some examples, based on the report, the billing system and/or the content management system may push promotions, new services, new products, etc., to the subscribers' user devices to retain the subscribers.

In yet another implementation, the job related to the subscriber data may include taking a snapshot on the subscriber data. The report may include the up-to-date information of the logic address of the subscriber data, which facilitates an administrative server to recover the subscriber data if necessary.

In some examples, the preset time period may be set as 60 seconds. In some other examples, the preset time period may vary depending on the type of jobs to be performed by the SDP system.

The techniques discussed herein may be implemented in a computer network using one or more of protocols including but are not limited to Ethernet, 3G, 4G, 4G LTE, 5G, 6G, the further radio access technologies, or any combination thereof. In some examples, the network implementations may support standalone architectures, non-standalone architectures, dual connectivity, carrier aggregation, etc. Example implementations are provided below with reference to the following figures.

FIG. 1 illustrates an example charging system 100 in a 5G network, in which methods for achieving complete redundancy for a subscriber data point (SDP) system are implemented.

The charging system 100, as illustrated in FIG. 1, may be coupled to a telecommunication network of a wireless service provider such as, T-Mobile, AT&T, Sprint, Verizon Wireless, etc. The telecommunication network may include one or more access networks and one or more core networks. The one or more access networks may be compatible with one or more radio access technologies, protocols, and/or standards, such as 5G NR technology, LTE/LTE Advanced technology, other Fourth Generation (4G) technology, High-Speed Data Packet Access (HSDPA)/Evolved High-Speed Packet Access (HSPA+) technology, Universal Mobile Telecommunication System (UMTS) technology, Code Division Multiple Access (CDMA) technology, Global System for Mobile Communications (GSM) technology, WiMAX technology, Wi-Fi technology, and/or any other previous or future generation of radio access technology.

In the 5G network, the charging system 100 is referred to as a converged charging system that may support both online charging mode and offline charging mode. Both online charging and offline charging can be performed regardless it is an event-based charging or a session-based charging. A chargeable event in an event-based charging may be a single user-to-network transaction, for example, sending a short text message, a multimedia message, completing a purchase of content (e.g., application, game, music, video on demand), etc. A chargeable event in a session-based charging may apply to a user session such as an IP multimedia system (IMS) session initiation protocol (SIP) session, or a voice call.

As illustrated in FIG. 1, the charging system 100 may include a charging trigger function (CTF) 102, a charging function (CHF) 104, an account balance management function (ABMF) 106, a charging gateway function (CGF) 108, a rating function (RF) 110, etc. The charging function 104 may include an online charging function (OCF) 114 and a charging data function (CDF) 116. The account balance management function 106, the charging gateway function 108, and the rating function 110 may be coupled to a billing system 112 of the 5G network.

In some examples, the charging trigger function 102 may be implemented to monitor the network resource consumption and generate charging events based on the network resource consumption. For online charging, the charging trigger function 102 may generate a charging event when a subscriber initiates a service usage. The charging trigger function 102 may send a charging data request to the charging function 104 to assign the service units to the subscriber. The charging function 104 may acknowledge the request by granting the service units to the charging trigger function through a charging data response. For online charging, an amount of balance may be reserved or deducted from the subscriber's credit balance.

In the online charging mode, when the charging trigger function 102 detects that a subscriber initiates a service usage, the charging trigger function 102 generates a charging event and sends a credit control request to the online charging function 114. The online charging function 114 may determine whether the subscriber has sufficient credit for the charging event. In some examples, the online charging function 114 may obtain the balance and/or credit associated with the subscriber from the account balance management function 106. In addition, the online charging function 114 may obtain the rating and/or pricing information for the service requested by the subscriber from the rating function 110. Based on the balance and/or credit associated with the subscriber and the rating and/or pricing information for the service requested by the subscriber, the online charging function 114 can determine whether the subscriber has sufficient credit for the service usage.

In some examples, when the service usage is initially requested, the charging trigger function 102 may request credit authorization from the online charging function 114. The charging trigger function 102 may hold the session from proceeding until an authorization is received from the online charging function 114. To authorize the session, the online charging function 114 may respond to the charging trigger function 102 with a reservation of units from the subscriber's account to proceed the session. When there is insufficient balance or credit in the subscriber's account, the charging trigger function 102 may notify the online charging function 114 with an interim event to terminate the session or recharge the account balance/credit. In addition, when the session is terminated, the charging trigger function 102 may report the final charging event to the online charging function 114. The online charging function 114 may further report the final charging event to the account balance management function 106 so as to return any unused quota to the subscriber's account.

In the offline charging mode, when the charging trigger function 102 detects that a subscriber initiates a service usage, the charging trigger function 102 generates a charging event and forwards the charging event to the charging data function 116. The charging data function 116 may generates a charging data record (CDR) corresponding to the charging event and send the charging data record to the charging gateway function 108. The charging gateway function 108 may further forward the charging data record to the billing system 112. In some examples, during the course of an established session, other chargeable events such as, an answer or a termination request, may also be forwarded to the charging data function 116. The charging data function 116 may bind these chargeable events into one or more charging data records based on the type of the session and transfer the one or more charging data records to the charging gateway function 108 for distribution to the billing system 112.

In some examples, the account balance management function 106 may include a subscriber data point (SDP) 120 that maintains the subscriber data. The subscriber data point 120 may include two or more active servers (e.g., first SDP server 122, second SDP server 128, etc.) that are configured to perform the scheduled operations on the subscriber data. In some examples, at least two servers are scheduled to run the same jobs to ensure the availability of the subscriber data in case of redundancy loss. The subscriber data point 120 may also include one or more standby servers that can be configured to run the jobs when one or more of the first SDP server 122 and the second SDP server 129 are unavailable to perform the jobs.

The first SDP server 122 and the second SDP server 128 may each store a replica of the subscriber data on a partition of the subscriber data point 120, e.g., first database 126 and second database 132. A first scheduler 124 of the first SDP server 122 may be executed to run a list of jobs on the first database 126 according to a schedule. Alternatively or additionally, a second scheduler 130 may be executed to run the list of jobs on the second database 132 according to the same or a different schedule. For example, the first SDP server 122 may perform data backup at midnight every 24 hours while the second SDP server 128 may perform data backup at 4 AM every 24 hours.

According to the current design of the subscriber data point 120, certain types of jobs are scheduled to run by one server of the subscriber data point 120. When that server is down or the job fails, the up-to-date subscriber data cannot be provided to the charging function 104 or the billing system 112, causing miscalculation of the subscriber's account balance. The present disclosure may schedule the certain types of jobs in the two or more active servers to ensure the availability of the up-to-date subscriber data when a redundancy loss occurs.

It should be understood that the example charging system 100 is for the purpose of illustration. The present disclosure is not intended to be limiting. The charging system 100 may be implemented on the telecommunication network using any existing and future radio access technologies.

Figure 2:
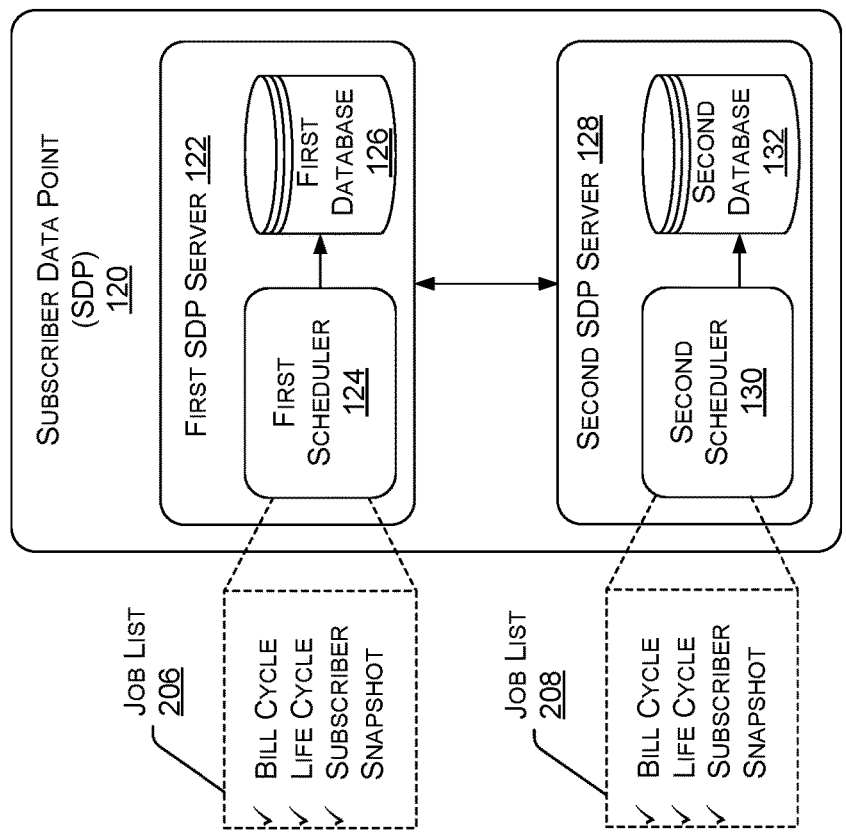
FIG. 2 illustrates a comparison of the jobs performed by the subscriber data point in the other approaches and the subscriber data point according to the present disclosure.
Figure 2:
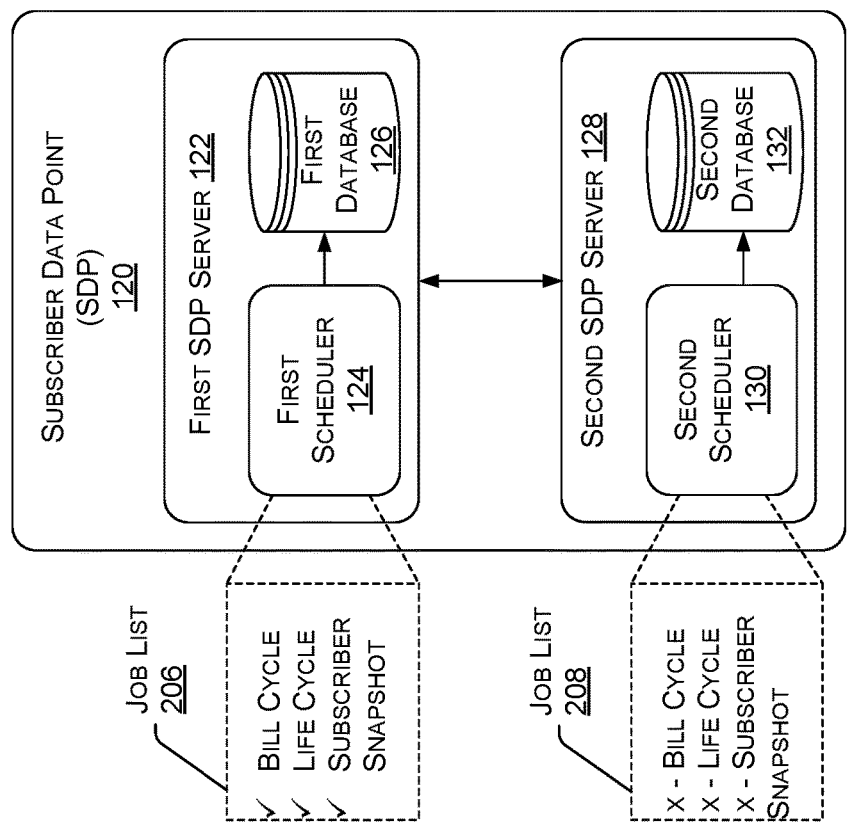

FIG. 2 illustrates a comparison 200 of the jobs performed by the subscriber data point in other approaches and the subscriber data point according to the present disclosure. As shown in FIG. 2, in other approaches, certain jobs including bill cycle, life cycle and subscriber snapshot are on the job list 206 performed by the first scheduler 124 of the first SDP server 122 but are not in the job list 208 performed by the second scheduler 130 of the second SDP server 128. The present disclosure adds these jobs to the second scheduler 130 of the second SDP server 128. When one of the first SDP server 122 and the second SDP server 128 is not available to run these jobs, the rest SDP server may instead perform these jobs, thus, remedying the redundancy loss.

Figure 3:
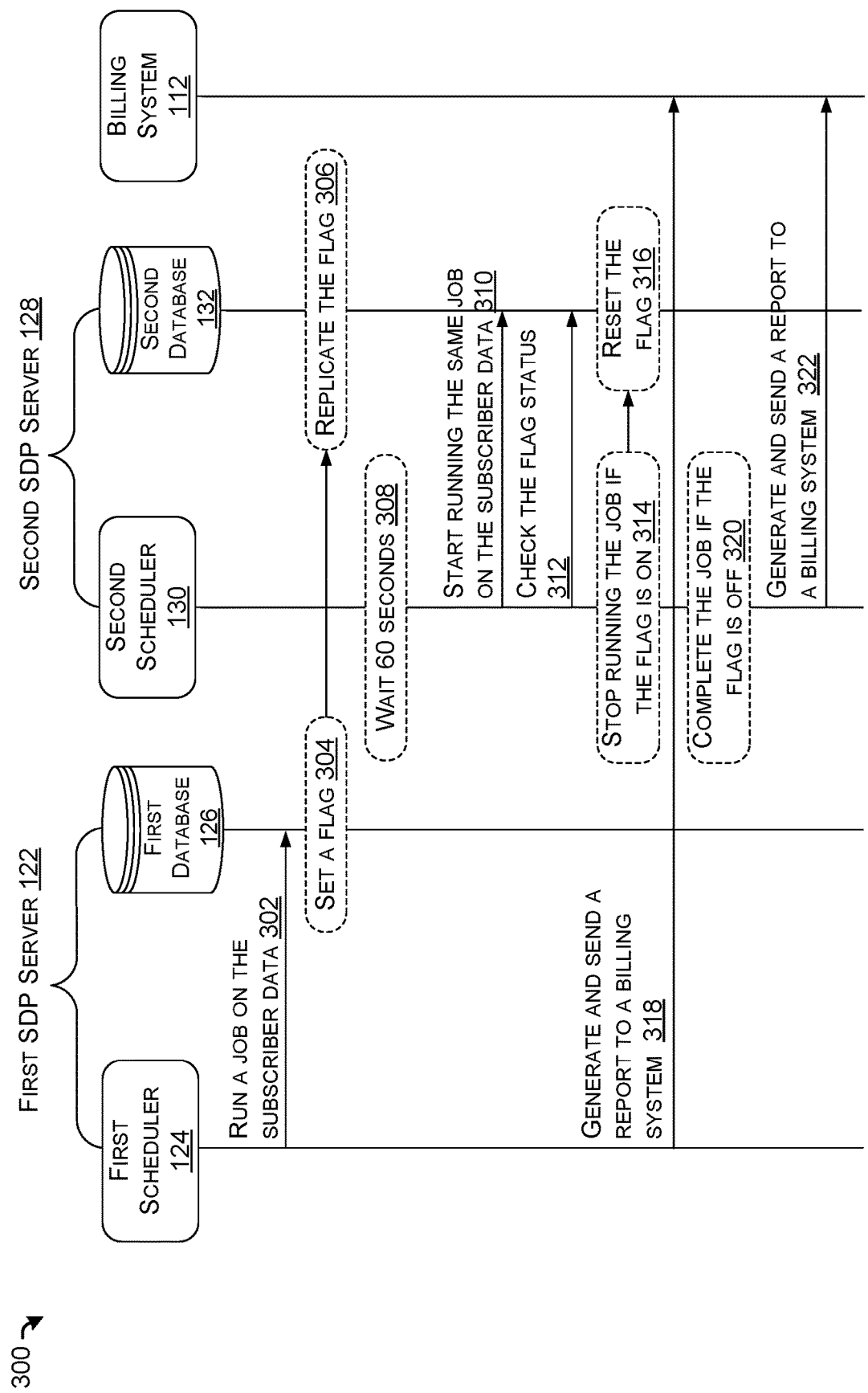
FIG. 3 illustrates an example process for achieving complete redundancy for a subscriber data point (SDP) system according to the present disclosure.

FIG. 3 illustrates an example process 300 for achieving complete redundancy for a subscriber data point (SDP) system according to the present disclosure.

As shown in FIG. 3, the first scheduler 124 of the first SDP server 122 may run a type of job on the subscriber data stored at the first database 126 at 302. Upon starting the job, the first scheduler 124 may set a flag at the first database 126 at 304. The flag may indicate that the type of job is performed by the first SDP server 122. In some examples, the flag may be represented by a binary number, wherein "1" indicates that a job is performed by the first SDP server 122 and "0" indicates that a job is not performed by the first SDP server 122. The flag may be further replicated to the second database 132 of the second SDP server 128 at 306. In some other examples, the flag may be represented by one or more characters, numbers, vectors, arrays, or any combination thereof.

In some examples, the second SDP server 128 may be scheduled to wait for a preset time period to run the same type of job on the subscriber data stored at the second database 132 to avoid generating duplicate reports. As shown in FIG. 3, the second schedule 130 may be configured to wait 60 seconds at 308. For instance, the first SDP server 122 may be scheduled to run the subscriber snapshot on the subscriber data at 0:00 AM every 24 hours and the second SDP server 128 may be scheduled to run the subscriber snapshot on the subscriber data at 0:01 AM every 24 hours.

As discussed herein, the second scheduler 130 of the second SDP server 128 may start running the same job on the subscriber data stored at the second database 132 at 310 after 60 seconds from the time the first scheduler 124 starts running the job. Upon starting the job, the second scheduler 130 may check the flag status at the second database 132 of the second SDP server 128 at 312. When the flag is on at the second database 132, the second scheduler 130 may determine that the same job is performed by the first scheduler 124 of the first SDP server 122 and stop running the job at 314. The second scheduler 130 may further reset the flag at the second database 132 of the second SDP server 128 at 316. If the job is successfully completed by the first SDP server 122, the first scheduler 124 may generate and send a report to a billing system 112 at 318.

When the flag is off, the second scheduler 130 may determine that the same job is not performed by the first SDP server 122 and therefore, may continue to complete the job at 320. The second scheduler 130 of the second SDP server 128 may generate and send a report to the billing system 112 at 322.

As discussed herein, by setting a flag status in the second database 132 and a time delay to perform the jobs from the second SDP server 128, the present disclosure can maintain the availability of the subscriber data even if one of the first SDP server 122 and the second SDP server 128 fails to perform the routine jobs and can efficiently perform the routine jobs on the subscriber data without generating duplicate reports.

Figure 4:
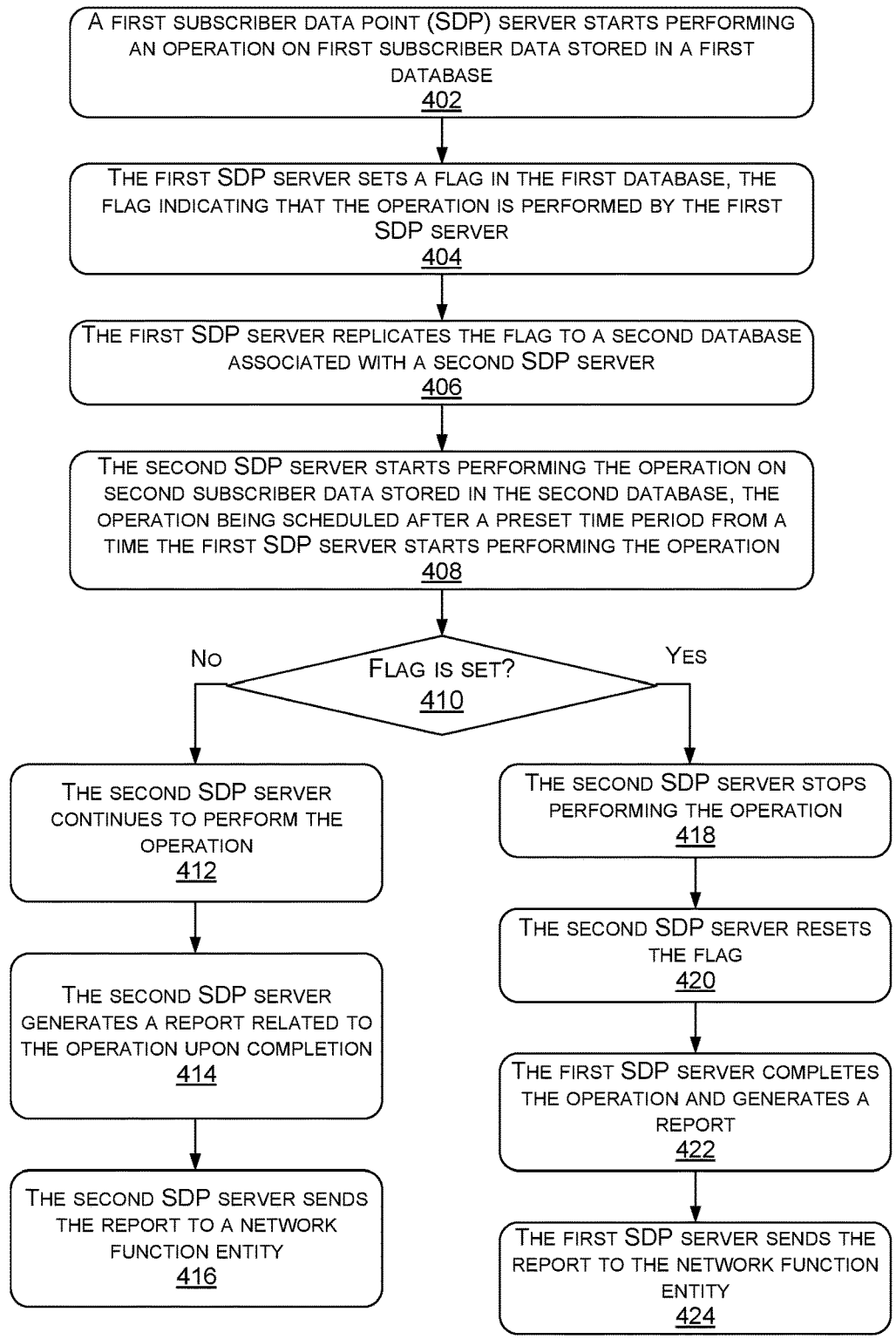
FIG. 4 illustrates an example flowchart for achieving complete redundancy for a subscriber data point (SDP) system according to the present disclosure.

FIG. 4 illustrates an example flowchart for achieving complete redundancy for a subscriber data point (SDP) system according to the present disclosure. The example flowchart 400 corresponds to the example process 300 shown in FIG. 3.

At operation 402, a first subscriber data point (SDP) server may start performing an operation on first subscriber data stored in a first database. As discussed herein, the first SDP server may be implemented on a charging system of a 5G network. The first SDP server may be one of the multiple servers on an account balance management function (ABMF) of the charging system. In some examples, the ABMF of the charging system may be implemented on a cluster and/or cloud environment. Each of the multiple servers may be logically reside in a partition of the ABFM of the charging system that holds a replica of the subscriber data.

The multiple servers may be scheduled to perform a list of jobs related to the subscriber data on a regular basis according to respective schedules. For example, the first SDP server may be scheduled to back up the subscriber data to other databases of the ABFM at midnight every day. In another example, the first SDP server may be scheduled to run bill cycle on the subscriber data every day and generate a report reflecting the up-to-date balance and/or credit of all the subscribers. The report may be further provided to a billing system for billing purpose. In yet another example, the first SDP server may be scheduled to run life cycle on the subscriber data every day and generate a report reflecting the up-to-date subscription information of all the subscribers. The billing system and/or other network elements may utilize the report to offer new products and/or new lines of business to retain the subscribers. In yet another example, the first SDP server may be scheduled to run a subscriber data snapshot every day, which may be further relied on to recover the subscriber data.

In some examples, to efficiently use the network resources and to avoid generating duplicate reports, the list of jobs may be performed by a portion of the multiple servers according to respective schedules. For example, the account balance management function of the charging system may activate at least two servers to perform the jobs and set the rest of the servers in a standby mode. Alternatively or additionally, the active servers may be scheduled to run the jobs at different schedule.

At operation 404, the first SDP server may set a flag in the first database, the flag indicating that the operation is performed by the first SDP server. In some examples, the flag may be a binary number written to the first database, where "1" represents the flag is on and "0" represents the flag is off. In another example, the flag may be one or more characters, where one character represents the flag is on and another character represents the flag is off. In yet another example, the first SDP server may configure the format of the flag to be any combination of numbers, characters, vectors, or arrays and distribute the format of the flag to other databases of the ABMF of the charging system.

At operation 406, the first SDP server may replicate the flag to a second database associated with a second SDP server. The second SDP server, similar to the first SDP server, may be part of the ABMF of the charging system and configured to perform the jobs related to the subscriber data based on a preset schedule.

At operation 408, the second SDP server may start performing the operation on second subscriber data stored in the second database, the operation being scheduled after a preset time period from a time the first SDP server starts performing the operation. In some examples, the second SDP server may be configured to wait 60 seconds to start the same operation that the first SDP server performs. In other examples, the preset time period may vary depending on the type of jobs. For example, the second SDP server may delay the running of bill cycle longer than the running of subscriber data snapshot.

At operation 410, the second SDP server may determine whether a flag is set in the second database. If the flag is set in the second database, at operation 418, the second SDP server may stop performing the operation.

At operation 420, the second SDP server may reset the flag in the second database. As discussed herein, once the second SDP server discovers that a flag is on in the second database, the second SDP server may determine that the operation is performed by the first SDP server and thus, skip the operation by itself. The second SDP server may reset the flag in the second database regardless of whether the operation is successfully performed by the first SDP server.

At operation 422, the first SDP server may complete the operation and generate a report. As discussed herein, the report may include an up-to-date balance and/or credit associated with all the subscribers stored in the first database, an up-to-date subscription information associated with all the subscribes stored in the first database, an up-to-date subscriber data snapshot in the first database, etc.

At operation 424, the first SDP server may send the report to a network function entity. In some examples, the network function entity may include a billing system that utilizes the report to generate the bills for the subscribers. In another example, the network function entity may include a content management system that utilizes the report to push information related to new services, new products, promotions, etc., to retain the existing subscribers. In yet another example, the network function entity may include an administrative server that utilizes the subscriber data snapshot to recover the subscriber data at certain time point.

If the flag is not set in the second database, at operation 412, the second SDP server may continue to perform the operation. As discussed herein, once the second SDP server discovers that a flag is not set in the second database, the second SDP server may determine that the operation is not performed by the first SDP server and continue the operation, as scheduled.

At operation 414, the second SDP server may generate a report related to the operation upon completion. The report may be generated based on the subscriber data stored in the second database. As discussed herein, the first database and the second database both store the subscriber data and the copies of the subscriber data stored therein may be the same or slightly different. The report generated by the second SDP server may still reflect an up-to-date version of the subscriber data.

At operation 416, the second SDP server may send the report to the network function entity. As discussed above, the network function entity may include a billing system, a content management system, an administrative server, etc.

Figure 5:
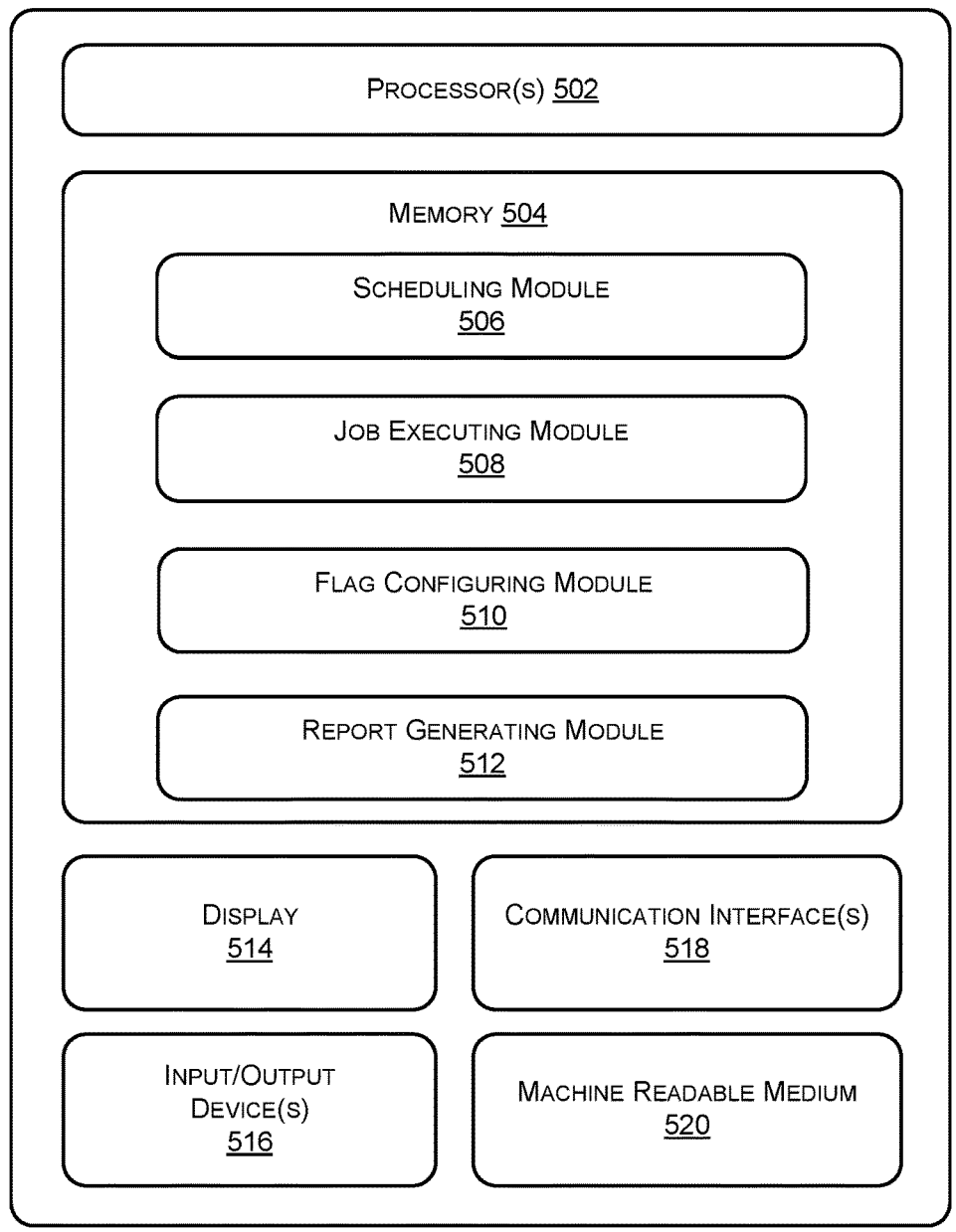
FIG. 5 illustrates an example computer device, in which methods for achieving complete redundancy for a subscriber data point (SDP) system are implemented according to the present disclosure.

FIG. 5 illustrates an example computer device, in which methods for achieving complete redundancy for a subscriber data point (SDP) system are implemented according to the present disclosure. The example computer device 500 may correspond to the subscriber data point 120, as illustrated in FIG. 1.

As illustrated in FIG. 5, the computer device 500 may comprise processor(s) 502, a memory 504 storing a scheduling module 506, a job execution module 508, a flag configuration module 510, and a report generating module 512, a display 514, input/output device(s) 516, communication interface(s) 518, and/or a machine readable medium 520.

In various examples, the processor(s) 502 can be a central processing unit (CPU), a graphics processing unit (GPU), or both CPU and GPU, or any other type of processing unit. Each of the one or more processor(s) 502 may have numerous arithmetic logic units (ALUs) that perform arithmetic and logical operations, as well as one or more control units (CUs) that extract instructions and stored content from processor cache memory, and then executes these instructions by calling on the ALUs, as necessary, during program execution. The processor(s) 502 may also be responsible for executing all computer applications stored in memory 504, which can be associated with common types of volatile (RAM) and/or nonvolatile (ROM) memory.

In various examples, the memory 504 can include system memory, which may be volatile (such as RAM), non-volatile (such as ROM, flash memory, etc.) or some combination of the two. The memory 504 can further include non-transitory computer-readable media, such as volatile and nonvolatile, removable and non-removable media implemented in any method or technology for storage of information, such as computer readable instructions, data structures, program modules, or other data. System memory, removable storage, and non-removable storage are all examples of non-transitory computer-readable media. Examples of non-transitory computer-readable media include, but are not limited to, RAM, ROM, EEPROM, flash memory or other memory technology, CD-ROM, digital versatile discs (DVD) or other optical storage, magnetic cassettes, magnetic tape, magnetic disk storage or other magnetic storage devices, or any other non-transitory medium which can be used to store desired information and which can be accessed by the computer device 500. Any such non-transitory computer-readable media may be part of the computer device 500.

The scheduling module 506 may be configured to schedule a plurality of jobs related to the subscriber data of the 5G network. In some examples, the scheduling module 506 may determine two or more servers of the subscriber data point of 5G network to perform certain jobs based on the respective capabilities and workloads of the servers. In another example, the scheduling module 506 may determine a time schedule for the two or more servers to perform the certain jobs. The job execution module 508 may be configured to execute the jobs on different partitions of the subscriber data point according to the schedule. In some examples, the job execution module 508 may call an application interface (API) to execute a program script corresponding to the type of jobs. The flag configuring module 510 may configure a format of flag shared by partitions of the subscriber data point. For instance, the flag configuring module 510 may configure the flag in a format of numbers, characters, vector, arrays, or any combination thereof. The report generating module 512 may be configured to generate the report corresponding to the type of jobs. In some examples, the report may represent an up-to-date balance or credit of the subscribers. In another example, the report may represent an up-to-date subscription information of the subscribers. In yet another example, the report may be a database snapshot that indicates the logic addresses of the subscriber data in the database.

The communication interface(s) 518 can include transceivers, modems, interfaces, antennas, and/or other components that perform or assist in exchanging radio frequency (RF) communications with base stations of the telecommunication network, a Wi-Fi access point, and/or otherwise implement connections with one or more networks. For example, the communication interface(s) 518 can be compatible with multiple radio access technologies, such as 5G radio access technologies and 4G/LTE radio access technologies. Accordingly, the communication interfaces 518 can allow the computer device 500 to connect to the 5G system described herein.

Display 514 can be a liquid crystal display or any other type of display commonly used in the computer device 500. For example, display 514 may be a touch-sensitive display screen and can then also act as an input device or keypad, such as for providing a soft-key keyboard, navigation buttons, or any other type of input. Input/output device(s) 516 can include any sort of output devices known in the art, such as display 514, speakers, a vibrating mechanism, and/or a tactile feedback mechanism. Input/output device(s) 516 can also include ports for one or more peripheral devices, such as headphones, peripheral speakers, and/or a peripheral display. Input/output device(s) 516 can include any sort of input devices known in the art. For example, input/output device(s) 516 can include a microphone, a keyboard/keypad, and/or a touch-sensitive display, such as the touch-sensitive display screen described above. A keyboard/keypad can be a push button numeric dialing pad, a multi-key keyboard, or one or more other types of keys or buttons, and can also include a joystick-like controller, designated navigation buttons, or any other type of input mechanism.

The machine readable medium 520 can store one or more sets of instructions, such as software or firmware, that embodies any one or more of the methodologies or functions described herein. The instructions can also reside, completely or at least partially, within the memory 504, processor(s) 502, and/or communication interface(s) 518 during execution thereof by the computer device 500. The memory 504 and the processor(s) 502 also can constitute machine readable media 520.

The various techniques described herein may be implemented in the context of computer-executable instructions or software, such as program modules, that are stored in computer-readable storage and executed by the processor(s) of one or more computing devices such as those illustrated in the figures. Generally, program modules include routines, programs, objects, components, data structures, etc., and define operating logic for performing particular tasks or implement particular abstract data types.

Other architectures may be used to implement the described functionality and are intended to be within the scope of this disclosure. Furthermore, although specific distributions of responsibilities are defined above for purposes of discussion, the various functions and responsibilities might be distributed and divided in different ways, depending on circumstances.

Similarly, software may be stored and distributed in various ways and using different means, and the particular software storage and execution configurations described above may be varied in many different ways. Thus, software implementing the techniques described above may be distributed on various types of computer-readable media, not limited to the forms of memory that are specifically described.

CONCLUSION

Although the subject matter has been described in language specific to structural features and/or methodological acts, it is to be understood that the subject matter is not necessarily limited to the specific features or acts described above. Rather, the specific features and acts described above are disclosed as example examples.

While one or more examples of the techniques described herein have been described, various alterations, additions, permutations and equivalents thereof are included within the scope of the techniques described herein.

In the description of examples, reference is made to the accompanying drawings that form a part hereof, which show by way of illustration specific examples of the claimed subject matter. It is to be understood that other examples can be used and that changes or alterations, such as structural changes, can be made. Such examples, changes or alterations are not necessarily departures from the scope with respect to the intended claimed subject matter. While the steps herein can be presented in a certain order, in some cases the ordering can be changed so that certain inputs are provided at different times or in a different order without changing the function of the systems and methods described. The disclosed procedures could also be executed in different orders. Additionally, various computations that are herein need not be performed in the order disclosed, and other examples using alternative orderings of the computations could be readily implemented. In addition to being reordered, the computations could also be decomposed into sub-computations with the same results.

What is claimed is:

1. A computer-implemented method, the method comprising:

scheduling a first computing device to perform an operation on subscriber data stored in a first database at a first time point;

scheduling a second computing device to perform the operation on a replica of the subscriber data stored in a second database at a second time point, the second time point being delayed a preset time period from the first time point;

upon detecting that the first computing device starts performing the operation, causing the first computing device to:

set a flag in the first database, and replicate the flag to the second database, upon detecting that the second computing device starts performing the operation, causing the second computing device to check a status of the flag;

upon determining that the status of the flag is set, causing the second computing device to terminate the operation, and reset the status of the flag in the second database, and causing the first computing device to complete the operation; and upon determining that the status of the flag is not set, causing the second computing device to complete the operation.

2. The computer-implemented method of claim 1, further comprising:

generating a report including a result of the operation; and transmitting the report to a billing system.

3. The computer-implemented method of claim 1, wherein the first computing device and the second computing device are located in a cluster environment associated with a charging system of a fifth generation (5G) network.

4. The computer-implemented method of claim 1, wherein the operation includes at least one of:
running a bill cycle on the subscriber data;
running a life cycle on the subscriber data; or
taking a snapshot on the subscriber data.

5. The computer-implemented method of claim 1, wherein the preset time period is set as 60 seconds.

6. A system comprising:
a processor,
a network interface, and
a memory storing instructions executed by the processor to perform actions including:
scheduling a first computing device to perform an operation on subscriber data stored in a first database at a first time point;
scheduling a second computing device to perform the operation on a replica of the subscriber data stored in a second database at a second time point, the second time point being delayed a preset time period from the first time point;
upon detecting that the first computing device starts performing the operation, causing the first computing device to:
set a flag in the first database, and
replicate the flag to the second database,
upon detecting that the second computing device starts performing the operation, causing the second computing device to check a status of the flag;
upon determining that the status of the flag is set,
causing the second computing device to terminate the operation, and reset the status of the flag in the second database, and
causing the first computing device to complete the operation; and upon determining that the status of the flag is not set,
causing the second computing device to complete the operation.

7. The system of claim 6, wherein the actions further include:
generating a report including a result of the operation; and
transmitting the report to a billing system.

8. The system of claim 6, wherein the first computing device and the second computing device are located in a cluster environment associated with a charging system of a fifth generation (5G) network.

9. The system of claim 6, wherein the operation includes at least one of:
running a bill cycle on the subscriber data;
running a life cycle on the subscriber data; or
taking a snapshot on the subscriber data.

10. The system of claim 6, wherein the preset time period is set as 60 seconds.

11. A computer-readable storage medium storing computer-readable instructions, that when executed by a processor, cause the processor to perform actions comprising:
scheduling a first computing device to perform an operation on subscriber data stored in a first database at a first time point;
scheduling a second computing device to perform the operation on a replica of the subscriber data stored in a second database at a second time point, the second time point being delayed a preset time period from the first time point;
upon detecting that the first computing device starts performing the operation, causing the first computing device to:
set a flag in the first database, and
replicate the flag to the second database,
upon detecting that the second computing device starts performing the operation, causing the second computing device to check a status of the flag;
upon determining that the status of the flag is set,
causing the second computing device to terminate the operation, and reset the status of the flag in the second database, and
causing the first computing device to complete the operation; and upon determining that the status of the flag is not set,
causing the second computing device to complete the operation.

12. The computer-readable storage medium of claim 11, wherein the actions further include:
generating a report including a result of the operation; and
transmitting the report to a billing system.

13. The computer-readable storage medium of claim 11, wherein the first computing device and the second computing device are located in a cluster environment associated with a charging system of a fifth generation (5G) network.

14. The computer-readable storage medium of claim 11, wherein the operation includes at least one of:
running a bill cycle on the subscriber data;
running a life cycle on the subscriber data; or
taking a snapshot on the subscriber data.

* * * * *